G. C. DABOLL.
Eye-Glass.

No. 217,778. Patented July 22, 1879.

UNITED STATES PATENT OFFICE.

GARRETT C. DABOLL, OF BUFFALO, NEW YORK.

IMPROVEMENT IN EYEGLASSES.

Specification forming part of Letters Patent No. 217,778, dated July 22, 1879; application filed November 22, 1878.

*To all whom it may concern:*

Be it known that I, GARRETT C. DABOLL, of the city of Buffalo, in the county of Erie and State of New York, have invented new and useful Improvements in Eyeglasses, of which the following is a specification, reference being had to the accompanying drawings.

This invention relates to a pair of eyeglasses which are provided with arms or braces adapted to bear against the under side of the arch of the eyebrows on both sides of the nose, thereby preventing the clamps or nose-pieces from raising the glasses out of place.

My invention consists in so constructing these arms or braces that their length and position can be readily adjusted, so as to adapt the same to the particular requirements of each wearer.

Figure 1:
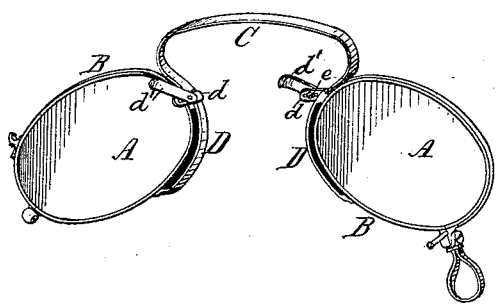
Figure 2:
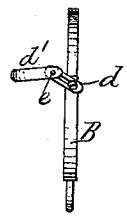

In the accompanying drawings, Figure 1 is a perspective view of a pair of eyeglasses provided with my improvements. Fig. 2 is a sectional elevation, and Fig. 3 a top-plan view, thereof. Fig. 4 shows a pair of eyeglasses provided with my improvements in a modified form.

Like letters of reference designate like parts in each of the figures.

A represents a pair of eyeglasses; B, the frames; C, the connecting-spring thereof, and D the clamps or nose-pieces, all of ordinary and well-known construction. $d$ represents an arm or brace, secured or pivoted to the inner side of each frame B at or near the point where the spring C is secured thereto. $d'$ is an extension, pivoted to each arm or brace $d$ by means of a screw, $e$, passing through a slot in the arm $d$, so as to permit the extension $d'$ to be turned on this screw to change its position, and also to permit it to be drawn out or pushed back to increase or reduce the length of the arm or brace.

The two arms are made converging, so as to bear against the under side of the arch of the eyebrows on both sides of the nose, thereby counteracting the tendency of the clamps D to raise the glasses, and securely holding the latter in place without any inconvenience to the wearer.

Figure 3:
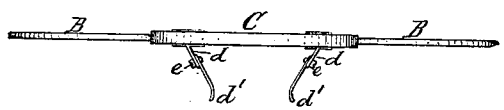
Figure 4:
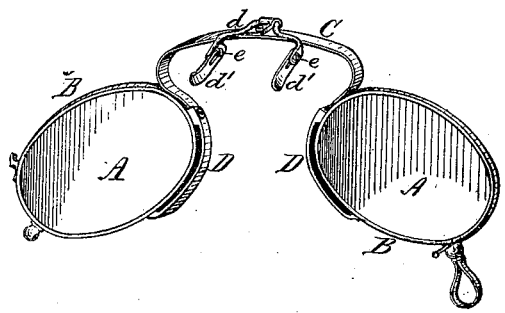

The two arms $d$, instead of being made disconnected and secured to the frames B, as shown in Figs. 1, 3, may be connected together and pivoted centrally to the spring C, as shown in Fig. 4. When the glasses are not required for use, the arms $d$, with their extensions, are readily folded, so as to be out of the way.

I claim as my invention—

1. A pair of eyeglasses provided with pivoted arms $d$, having sliding extensions $d'$, whereby the length of the arms can be increased or reduced, substantially as set forth.

2. A pair of eyeglasses provided with arms $d$, having extensions $d'$, connected therewith by a screw, $e$, passing through a slot in the arm $d$, substantially as and for the purpose set forth.

G. C. DABOLL.

Witnesses:
JNO. J. BONNER,
EDW. J. BRADY.